E. J. WILLIAMS.
COMBINED HAY LOADER AND RAKE.
APPLICATION FILED JUNE 1, 1909.
1,021,648.
Patented Mar. 26, 1912.
2 SHEETS—SHEET 2.
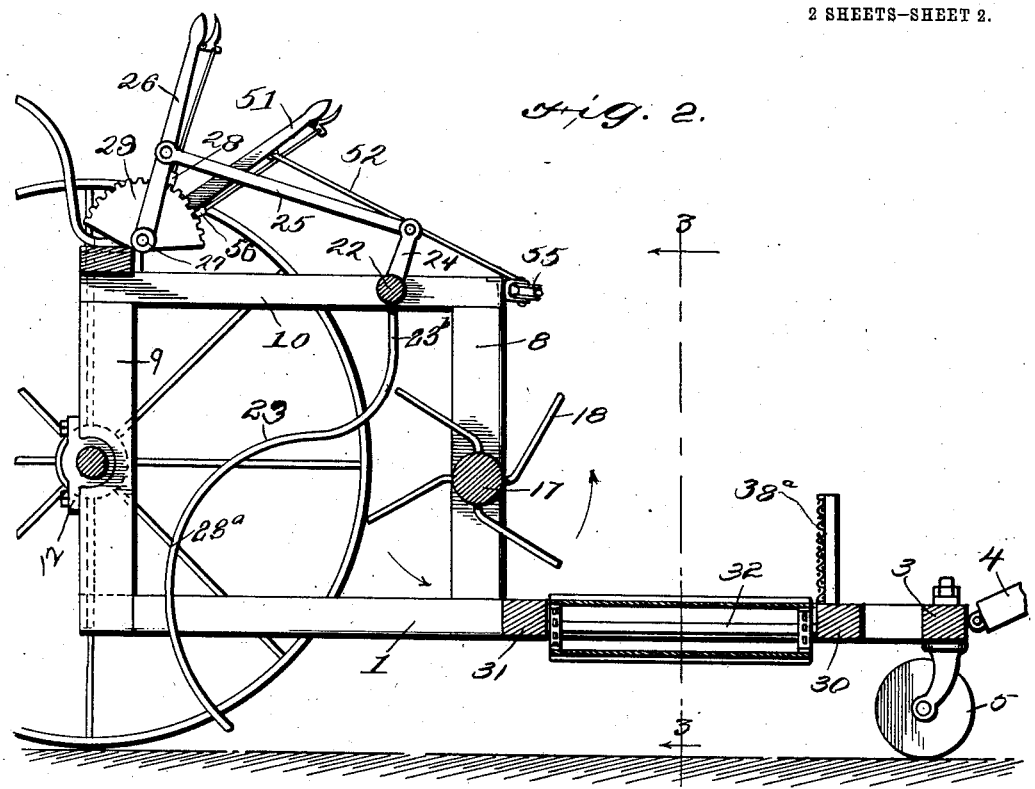
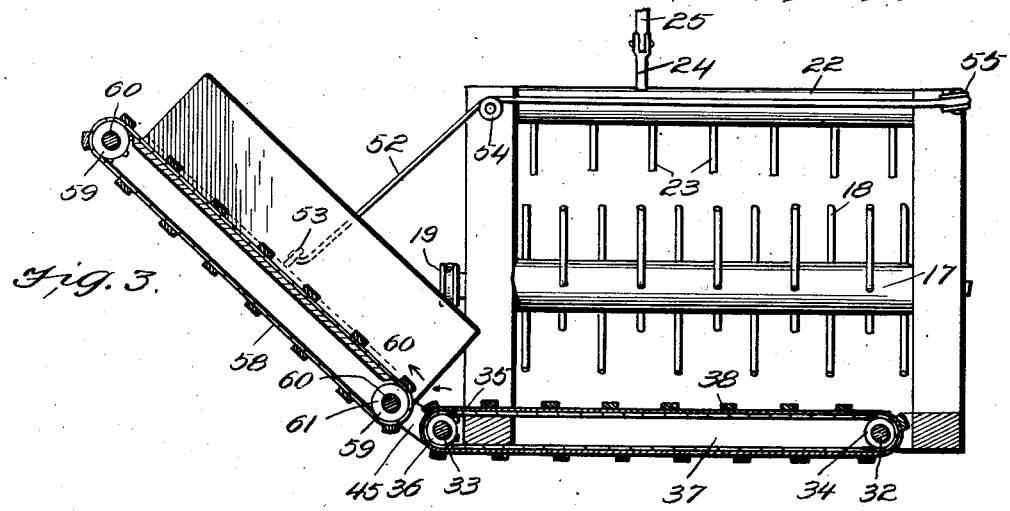
Witnesses:
Inventor,
Enoch J. Williams,
By Victor J. Evans
Attorney.

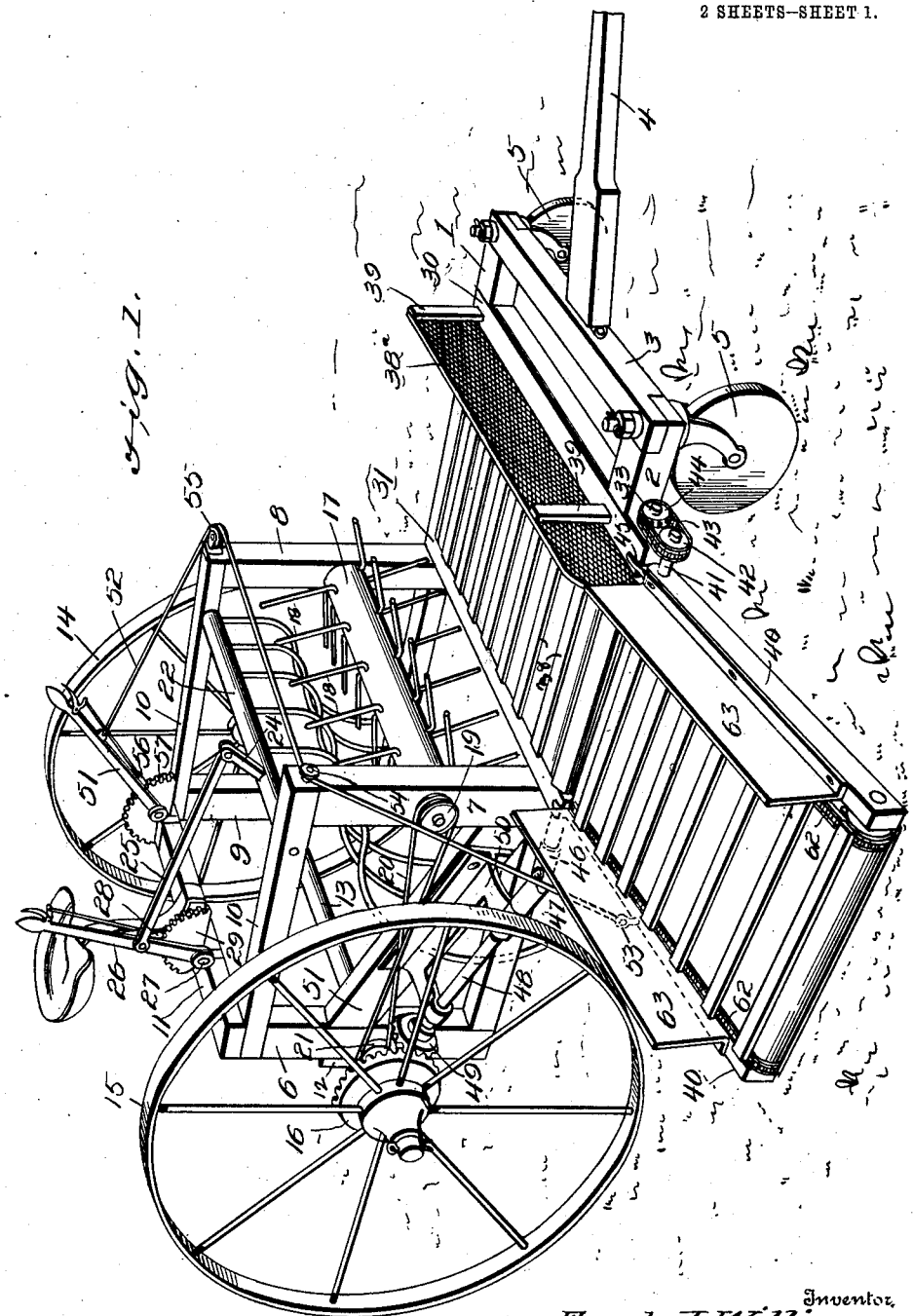

UNITED STATES PATENT OFFICE.

ENOCH J. WILLIAMS, OF LANGDON, KANSAS.

COMBINED HAY LOADER AND RAKE.

1,021,648.      Specification of Letters Patent.      Patented Mar. 26, 1912.

Application filed June 1, 1909. Serial No. 499,296.

*To all whom it may concern:*

Be it known that I, ENOCH J. WILLIAMS, a citizen of the United States, residing at Langdon, in the county of Reno and State of Kansas, have invented new and useful Improvements in Combined Hay Loaders and Rakes, of which the following is a specification.

This invention relates to combined hay loaders and rakes.

The object of the invention is to provide an apparatus of this character which will be simple in construction, efficient and durable in use, and composed of comparatively a few number of parts, the various mechanisms being so constructed and assembled as to withstand the strains and wear to which they are subjected without danger of becoming deranged.

With the above and other objects in view, as will appear as the nature of the invention is better understood, the same consists in the novel construction and combination of parts of a combined hay loader and rake, as will be hereinafter fully described and claimed.

In the accompanying drawings, forming a part of this specification, and in which like characters of reference indicate corresponding parts, Figure 1 is a view in perspective of an apparatus constructed in accordance with the present invention. Fig. 2 is a vertical longitudinal sectional view through the apparatus. Fig. 3 is a transverse sectional view taken on the line 3—3 of Fig. 2, and looking in the direction of the arrows thereon.

The supporting frame of the machine embodies two sill beams 1 and 2 the forward ends of which are connected by a cross-brace 3 with which is pivotally connected the tongue 4 by which the machine is drawn over the ground. Extending through the mortised ends of the sill beams and cross-brace are the shanks of a pair of caster wheels 5 of the usual and preferred construction. Supported upon or secured to the sill beams are four uprights 6, 7, 8 and 9, forming a substantially rectangular framework, the uprights 6 and 7 and 8 and 9 being connected by brace beams 10, and the uprights 6 and 9 being connected by a brace beam 11. Journaled in suitable boxes 12 secured to the rear sides of the uprights 6 and 9 is a shaft 13 upon which are mounted the ground wheels 14 and 15, the hub of the latter having secured to it a beveled gear 16, the function of which will appear later on. Journaled in bearings formed in the uprights 7 and 8 is a shaft 17 with which is combined beater arms 18, which may be of the construction shown in Fig. 2, or otherwise. The end of the shaft that is journaled in the uprights 7 and 8 projects beyond the upright 7 and is furnished with a grooved sheave 19 that is engaged by a cross-belt 20 driven from a sheave 21 carried by the shaft 13.

The rake mechanism embodies a shaft 22, the ends of which are reduced and journaled in the brace beams 10, and to which are secured in any preferred manner the rake teeth 23 which are of the usual spring type. The shaft 22 carries an arm 24 with which connects one end of a link 25, the other end of which is pivotally connected with a hand lever 26 mounted upon the shaft 27 suitably supported upon the brace beam 11. As usual, the lever has connected with it a spring pressed locking pawl 28 that is designed to engage with a segmental rack plate 29 rigid with the brace beam 11. From this arrangement it will be seen that the rake teeth may readily be adjusted so as to secure the best results in operation, merely by throwing the lever 26 to the proper point to secure the object designed.

Each rake tooth has a curved lower portion 23$^a$ the concave side of which is presented to the front end of the machine and the reversely curved upper portion 23$^b$, the convex side of which is presented to the front end of the machine, said upper portion extending forwardly from the lower portion. It will be observed that the beater which comprises the shaft 17 and the beater arms 18 is disposed in advance of the rake at a point opposite the forwardly extending upper portions of the rake teeth and that the said beater is so geared as to cause its lower side to move forwardly when the beater is in rotation as indicated by the arrows in Fig. 2. The concave lower portions of the curved rake teeth cause the hay to be rolled up and to turn forwardly under the forwardly extending upper portions of the rake teeth and the revolving beater acts on the upper side of said roll so as to throw the hay continuously from the upper side of the roll, as the latter is being formed, on the carrier platform.

Secured to the sill beams 1 and 2 are two cross beams 30 and 31 in which are journaled two shafts 32 and 33, the former of which is furnished with a roller 34 and the latter with a pair of sprocket wheels 35, one of which is shown in Fig. 3. The shaft 33 is also provided with a roller 36, and the two rollers are engaged by an endless belt 37 having the usual slats 38 by which the hay fed to the belt by the rake teeth and beaters is moved toward the elevator presently to be described. In order to prevent the hay from escaping from the forward side of the platform, which latter consists of the belt 37, there is a screen 38ª employed that is secured to the uprights 39 supported by the cross-beam 30.

The elevator comprises two beams or members 40, through the rear portion of which passes a shaft 41 carrying at its outer end a sprocket wheel 42 that is engaged by a sprocket chain 43 which latter engages a sprocket wheel 44 carried by the outer end of the shaft 33, and by which the platform is driven. The rear ends of the side beams 40 are reduced to form hinged members 45 that fit in mortises in the inner ends of the cross-beam 30, and are journaled upon the shaft 33.

The end of the shaft 41 opposite that carrying the sprocket wheel 42 is provided with one member 46 of a universal joint, the other member 47 of which is carried by one end of a shaft 48 that carries a beveled gear 49 which meshes with the gear 16. The shaft 48 is mounted in journals formed on a bracket 50 that is securely bolted to an inclined beam 51 interposed between the uprights 6 and 7, and firmly secured thereto. The object of the universal joint is to permit of the elevator being tilted in any desired angle, as shown in Fig. 3. To secure this result, there is a hand lever 51 provided with which connects one end of a chain or cable 52, the other end of which is connected with an eye bolt 53 secured to one of the side beams 40 of the elevator. In order to reduce the resistance to the operation of raising and lowering the elevator, guide pulleys 54 and 55 are provided, which are carried by the uprights 7 and 8 respectively, and around which the flexible member 52 passes. The lever 51 carries an ordinary spring-pressed pawl 56 that is designed to engage with a segmental rack plate 57 to hold the elevator in any desired adjustment.

As shown in Fig. 3, the elevator embodies an endless slatted apron 58 that passes around rollers 59 carried by shafts 60 that are journaled in the side beams 40, one of the shafts carrying a pair of sprocket wheels 61, and these engage sprocket chains 62 carried by the apron or elevator 58.

From the foregoing description it will be seen that when a machine is moved over the ground that motion will be imparted from the beveled gear 16 to the gear 49, and thus through the medium of the shaft 48 and universal joint to the shaft 33, thereby driving the platform. The motion from the shaft 33 is transmitted by the sprocket wheel 43 to the shaft 42, and this latter drives the elevator apron 58. Coincidently with the driving of the platform and the elevator, the beaters are actuated, and serve to throw on to the platform the hay gathered by the rake teeth.

In order to prevent the hay from falling off from the elevator the latter is provided with longitudinal guards 63, as clearly shown in Fig. 1.

From the foregoing description it will be seen that although the improvements herein defined are simple in character, that they will be thoroughly efficient for the purposes designed, and will co-act in the production of a thoroughly practical, durable, and efficient form of combined hay loader and rake.

What is claimed is:—

In a combined hay rake and loader, a wheel supported frame structure, a rake head supported for oscillation upon the frame, means for adjusting the rake head, teeth connected with the rake head, each tooth in the form of a compound curve with a forwardly presented convex upper portion and a forwardly presented concave lower portion, a shaft supported for rotation upon the frame in front of the rake, beater arms extending from the shaft co-acting with the forwardly presented convex upper portions of the rake teeth to form a throat constricted against the passage of hay and operating on the hay during the lower part of their revolution, an endless carrier supported upon the frame in front of the beater and the rake, said carrier being transversely disposed to deliver material at one side of the frame, an elevator hingedly associated with the discharge end of the carrier and receiving motion therefrom, means for adjusting the elevator and for retaining it at various adjustments, means for transmitting motion to the endless carrier from one of the supporting wheels, and means for transmitting motion from one of the supporting wheels to the beater carrying shaft.

In testimony whereof I affix my signature in presence of two witnesses.

ENOCH J. WILLIAMS.

Witnesses:
J. F. IVES,
T. C. COOPER.

Copies of this patent may be obtained for five cents each, by addressing the "Commissioner of Patents Washington, D. C."